United States Patent
Okitsu et al.

(10) Patent No.: US 8,145,927 B2
(45) Date of Patent: Mar. 27, 2012

(54) OPERATION MANAGEMENT METHOD OF INFORMATION PROCESSING SYSTEM

(75) Inventors: Jun Okitsu, Yokohama (JP); Takeshi Kato, Akishima (JP); Tatsuya Saito, Kunitachi (JP); Tadakatsu Nakajima, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/003,687

(22) PCT Filed: Mar. 9, 2009

(86) PCT No.: PCT/JP2009/054446
§ 371 (c)(1),
(2), (4) Date: Jan. 11, 2011

(87) PCT Pub. No.: WO2010/032501
PCT Pub. Date: Mar. 25, 2010

(65) Prior Publication Data
US 2011/0113273 A1    May 12, 2011

(30) Foreign Application Priority Data
Sep. 17, 2008 (JP) .................................. 2008-237325

(51) Int. Cl.
*G06F 1/26* (2006.01)
*G05D 23/19* (2006.01)

(52) U.S. Cl. ........ 713/320; 713/300; 713/310; 718/102; 718/104; 718/105

(58) Field of Classification Search .................. 713/300, 713/310, 320; 718/102, 104, 105
See application file for complete search history.

(56) References Cited

U.S. PATENT DOCUMENTS

| 7,472,558 | B1 * | 1/2009 | Narita .............................. 62/175 |
| 2006/0112286 | A1 * | 5/2006 | Whalley et al. ............... 713/300 |
| 2006/0259621 | A1 | 11/2006 | Ranganathan et al. |
| 2006/0259793 | A1 | 11/2006 | Moore et al. |
| 2007/0078635 | A1 * | 4/2007 | Rasmussen et al. ............. 703/1 |
| 2007/0174024 | A1 * | 7/2007 | Rasmussen et al. ............. 703/1 |
| 2007/0180117 | A1 | 8/2007 | Matsumoto et al. |
| 2008/0301479 | A1 * | 12/2008 | Wood ............................. 713/322 |
| 2009/0254909 | A1 * | 10/2009 | Hanson et al. ................ 718/102 |
| 2009/0259345 | A1 | 10/2009 | Kato et al. |

FOREIGN PATENT DOCUMENTS

| JP | 11-296488 A | 10/1999 |
| JP | 2004-126968 A | 4/2004 |
| JP | 2004240669 | 8/2004 |

(Continued)

*Primary Examiner* — Kim Huynh
*Assistant Examiner* — Zahid Choudhury
(74) *Attorney, Agent, or Firm* — Mattingly & Malur, PC

(57) ABSTRACT

In a computer room including information processing devices and air conditioners, power saving of the computer room by means of optimization of workload allocation to the information processing devices is achieved in a short time. There, a coefficient of air conditioner performance with respect to the information processing device (device-specific COP) is calculated for each air conditioner. Further, a device-associated power consumption expression representing a total of device power and air conditioner power is created for each information processing device. Also, power consumption of the entire computer room is calculated from the device-associated power consumption expression of the information processing devices. Also, workload allocation is determined by using power saving performance evaluation indexes based on the device-associated power consumption expression of the information processing devices. Further, output of the air conditioner is controlled based on a result of the air conditioner power calculation.

16 Claims, 18 Drawing Sheets

FOREIGN PATENT DOCUMENTS

| | | |
|---|---|---|
| JP | 2005063066 | 3/2005 |
| JP | 2005-531047 A | 10/2005 |
| JP | 2005-312142 A | 11/2005 |
| JP | 2005-321162 A | 11/2005 |
| JP | 2006-62453 A | 3/2006 |
| JP | 2006285317 | 10/2006 |
| JP | 2006344162 | 12/2006 |
| JP | 2007-179437 A | 7/2007 |
| JP | 2007-536657 A | 12/2007 |
| WO | 03083693 | 10/2003 |

* cited by examiner

FIG. 3

| DEVICE ID $i$ (310) | DEVICE TYPE (320) | DEVICE POWER MINIMUM VALUE $PDmini$ (330) | DEVICE POWER MAXIMUM VALUE $PDmaxi$ (340) | PROCESSING PERFORMANCE MAXIMUM VALUE $Wi$ (350) | ALLOCABLE PROCESSING PERFORMANCE (360) | RESOURCE UTILIZATION RATIO MAXIMUM VALUE $Xi$ (370) | DEVICE POWER EXPRESSION $PDi(x)$ (380) |
|---|---|---|---|---|---|---|---|
| 1 | SERVER DEVICE | 100 | 200 | 100 | 100 | 80 | $PDmini+(PDmaxi-PDmini)\times x/100$ |
| 2 | SERVER DEVICE | 50 | 100 | 70 | 70 | 40 | $PDmini+(PDmaxi-PDmini)\times x/100$ |

FIG. 4

| AIR CONDITIONER ID $j$ | AIR CONDITIONER COP $COP_j$ |
|---|---|
| 1 | 4.0 |
| 2 | 5.0 |

| WORKLOAD ID $k$ | ALLOCATION TARGET DEVICE TYPE | WORKLOAD AMOUNT | ALLOCATION POLICY |
|---|---|---|---|
| 1 | SERVER DEVICE | 20 | POWER SAVING PRIORITY |
| 2 | SERVER DEVICE | 20 | SERVICE PRIORITY |
| 3 | SERVER DEVICE | 20 | POWER SAVING PRIORITY |

| WORKLOAD ID $k$ | ALLOCATED DEVICE ID $i$ |
|---|---|
| 1 | 1 |
| 2 | 2 |
| 3 | 1 |

| AIR CONDITIONER ID $j$ | DEVICE ID $i$ | DISTANCE $Lji$ | DEVICE-SPECIFIC COP $COPji$ |
|---|---|---|---|
| 1 | 1 | 5 | 6.4 |
|   | 2 | 5 | 6.4 |
| 2 | 1 | 5 | 8.0 |
|   | 2 | 10 | 2.0 |

FIG. 10

| DEVICE ID $i$ | DEVICE-ASSOCIATED POWER CONSUMPTION EXPRESSION $Pi(x)$ |
|---|---|
| 1 | $\{1+(1/6.4+1/8.0)/2\} \times PD1(x)$ |
| 2 | $\{1+(1/6.4+1/2.0)/2\} \times PD2(x)$ |

FIG. 11

| DEVICE ID $i$ | POWER SAVING PERFORMANCE EVALUATION INDEX $EEi$ | SERVICE CONTINUITY EVALUATION INDEX $ESi$ |
|---|---|---|
| 1 | 0.40 | 20 |
| 2 | 0.30 | 42 |

FIG. 14

| DEVICE ID $i$ 1410 | DEVICE TYPE 1420 | DEVICE POWER MINIMUM VALUE $PDmin_i$ 1430 | DEVICE POWER MAXIMUM VALUE $PDmax_i$ 1440 | PROCESSING PERFORMANCE MAXIMUM VALUE $W_i$ 1450 | ALLOCABLE PROCESSING PERFORMANCE 1460 | RESOURCE UTILIZATION RATIO MAXIMUM VALUE $X_i$ 1470 | DEVICE POWER EXPRESSION $PD_i(x)$ 1480 |
|---|---|---|---|---|---|---|---|
| 3 | STORAGE DEVICE | 200 | 300 | 200 | 200 | 100 | $PDmax$ |
| 4 | STORAGE DEVICE | 150 | 200 | 100 | 100 | 100 | $PDmax$ |

| 1500 1510 | 1520 | 1530 |
|---|---|---|
| WORKLOAD ID $k$ | ALLOCATION TARGET DEVICE TYPE | WORKLOAD AMOUNT |
| 5 | STORAGE DEVICE | 100 |
| 6 | STORAGE DEVICE | 120 |
| 7 | STORAGE DEVICE | 50 |

FIG. 16

| 1600 1610 | 1620 | 1630 | 1640 |
|---|---|---|---|
| AIR CONDITIONER ID $j$ | DEVICE ID $i$ | DISTANCE $Lji$ | DEVICE-SPECIFIC COP $COPji$ |
| 1 | 3 | 10 | 1.6 |
| | 4 | 10 | 1.6 |
| 2 | 3 | 5 | 8.0 |
| | 4 | 10 | 2.0 |

FIG. 17

| DEVICE ID $i$ | DEVICE-ASSOCIATED POWER CONSUMPTION EXPRESSION $Pi(x)$ |
|---|---|
| 3 | $\{1+(1/1.6+1/8.0)/2\} \times PDmaxi$ |
| 4 | $\{1+(1/1.6+1/2.0)/2\} \times PDmaxi$ |

FIG. 18

| DEVICE ID $i$ | POWER SAVING PERFORMANCE EVALUATION INDEX $EEi$ |
|---|---|
| 3 | 0.43 |
| 4 | 0.22 |

FIG. 19

| WORKLOAD ID $k$ | ALLOCATED DEVICE ID $i$ |
|---|---|
| 5 | 3 |
| 6 | 3 |
| 7 | 3 |

FIG. 22

| AIR CONDITIONER ID $j$ | DEVICE ID $i$ | DEVICE POWER MEASURED VALUE $PDi$ | AIR CONDITIONER POWER EXPRESSION $PCji$ | AIR CONDITIONER POWER $PCj$ |
|---|---|---|---|---|
| 1 | 1 | 180 | $(1/6.4+1/8.0)/2 \times PDi$ | 189 |
| | 2 | 70 | $(1/6.4+1/2.0)/2 \times PDi$ | |
| | 3 | 300 | $(1/1.6+1/8.0)/2 \times PDi$ | |
| | 4 | 50 | $(1/1.6+1/2.0)/2 \times PDi$ | |
| 2 | 1 | 180 | $(1/4.8+1/1.2)/2 \times PDi$ | 217 |
| | 2 | 70 | $(1/6.0+1/1.5)/2 \times PDi$ | |
| | 3 | 300 | $(1/4.8+1/6.0)/2 \times PDi$ | |
| | 4 | 50 | $(1/1.2+1/1.5)/2 \times PDi$ | |

2200 2210 2220 2230 2240 2250

| AIR CONDITIONER ID $j$ | DEVICE ID $i$ | DISTANCE $Lji$ | DEVICE-SPECIFIC COP $COPji$ |
|---|---|---|---|
| 1 | 1 | 5 | 6.4 |
|   | 2 | 10 | 6.4 |
|   | 3 | 5 | 1.6 |
|   | 4 | 10 | 1.6 |
| 2 | 1 | 5 | 8.0 |
|   | 2 | 10 | 2.0 |
|   | 3 | 5 | 8.0 |
|   | 4 | 10 | 2.0 |

OPERATION MANAGEMENT METHOD OF INFORMATION PROCESSING SYSTEM

TECHNICAL FIELD

The present invention relates to an operation management method of an information processing system including a group of information processing devices such as server devices, storage devices and network devices and cooling equipment for cooling the devices, and more particularly to workload allocation to the group of information processing devices, which is required to achieve the integrative power saving operation of the group of information processing devices and the cooling equipment.

BACKGROUND ART

It is expected that information processing devices such as server devices, storage devices and network devices will explosively increase for the recent rapid development of information communication and toward an age of fusion of broadcasting and communication. On the other hand, in order to reduce carbon dioxide for the prevention of global warming, it is necessary to reduce the power consumption of information processing infrastructure including these information processing devices. In particular, in a data center taking a role of the information processing infrastructure in the back end, in addition to the device power which is the power consumed by a group of information processing devices, the cooling power which is the power consumed by cooling equipment for cooling the devices also accounts for a large share of the power consumption, and comprehensive power reduction of the device power and the cooling power is what needs to be achieved.

Respective approaches for the power saving of the data center have been started in information processing devices such as server devices, storage devices and network devices, cooling equipment, and operation management. In the information processing device, the improvement in performance per power consumption by means of a low-power device and the employment of the power saving function by the switching of operating states in accordance with workload have been promoted. In the cooling equipment, the operational efficiency improvement of an air conditioner itself, the optimization of an airflow design of an inlet and an outlet and the introduction of local cooling and liquid cooling have been started. In the operation management, the operation information monitoring, the job scheduling and the operational efficiency improvement or consolidation of a device group by means of virtualization have been adopted as main measures. Though the cooling equipment is generally designed based on the maximum rated power of the device group, the power consumption of the cooling equipment during operation depends heavily on distribution and fluctuation of the power of the device group with respect to the cooling equipment. For example, since the efficiency of the air conditioner depends on the power or heat generation of the device, a position relationship and a distance between the air conditioner and the device, a temperature, an air volume, an airflow direction and the like, the cooling power is heavily influenced by the power and the arrangement of the device. Since it is expected that consolidation of server devices by means of virtualization technology will be utilized for the power saving with the advance of an operation management technology of the data center, it becomes necessary to take measures to reduce the total power of the device group and the cooling equipment with due consideration of the uneven power distribution and the time fluctuation of the device group with respect to the cooling equipment. Some examples have been conventionally known as the operation management method of devices such as server devices and storage devices and cooling equipment, but they still remain in local or sequential measures in terms of the comprehensive power saving described above.

In Japanese Patent Application Laid-Open Publication No. 2004-126968 (Patent Document 1), in a management server for performing the job scheduling to parallel computers, a new job is input into a low-temperature computer based on temperature sensor information of the computers, and a job is transferred from a high-temperature computer to a low-temperature computer, thereby preventing the failure and the performance degradation in the parallel computers due to high temperature. Furthermore, whether to transfer a job is determined by estimating the power consumption of each computer and cooling equipment provided for each computer before and after the job transfer based on temperature information.

In Japanese Patent Application Laid-Open Publication No. 2007-179437 (Patent Document 2), in a management system for a plurality of computers, an overheated computer and a non-overheated computer are extracted based on temperature distribution and operation information of the computers, and software is transferred from the former to the latter, thereby achieving the power saving. Furthermore, after the extraction of target computers, fluctuations in computer power and air conditioner power before and after the transfer of the software are compared, thereby determining whether to transfer the software. The computer power is obtained from the operation information, the air conditioner power is obtained from the temperature distribution, and the temperature distribution is obtained from temperature sensors, a temperature history and the operation information.

In US Patent Application Publication No. 2006/0259621 (Patent Document 3), in a method of allocating workloads to a plurality of servers in a data center, a requested workload profile is compared with a historical profile, and the requested workload is allocated to a server in accordance with a history that minimizes the power of the server and an air conditioner, or randomly allocated if there is no matching history. The historical profile includes server location, class, operation information, inlet temperature, outlet temperature, workload type and power of the server and air conditioner. The power of the server and air conditioner is obtained from the inlet and outlet temperatures of the server, specific heat and air volume or measured by a power meter.

In US Patent Application Publication No. 2006/0259793 (Patent Document 4), in a method of distributing power to a plurality of servers in a data center, power budgets are lent and borrowed between the servers or racks that are close in geographic location so as to approach to an ideal and analog temperature distribution or power distribution, and a discretized power state of the server is assigned based on the budget distribution, thereby preventing the failure of the servers due to a hot spot or a cold spot. A thermal multiplier indicating ideal power for each server is obtained from an outlet temperature of each server, a reference outlet temperature of an average server and a supply air temperature of air conditioner.

Patent Document 1: Japanese Patent Application Laid-Open Publication No. 2004-126968
Patent Document 2: Japanese Patent Application Laid-Open Publication No. 2007-179437
Patent Document 3: US Patent Application Publication No. 2006/0259621

Patent Document 4: US Patent Application Publication No. 2006/0259793

SUMMARY OF THE INVENTION

Problems to be Solved by the Invention

In Patent Document 1, a job is allocated to a low-temperature computer of parallel computers, but this does not always contribute to power saving. Furthermore, since the power consumptions of the computers before and after the transfer of a job are estimated, although power associated with a transfer source and a transfer destination decreases, this is only local power saving for the whole of the parallel computers. More specifically, this does not lead to comprehensive power saving of a computer room. In Patent Document 2, fluctuations in computer power and air conditioning power before and after the transfer of software are compared with each other, but objects to be compared are limited to the extracted overheated and non-heated computers, and the total power of the computer group and the air conditioning equipment is not considered. More specifically, this does not lead to comprehensive power saving of the computer room. In Patent Document 3, since workload is allocated to a server based on the historical profile that minimizes the power of the server and air conditioner, the total power of a server group and the air conditioning equipment can be reduced for the workload within a range of the history, but in the case of workload having no history, the improvement is conducted only sequentially according to the accumulation of history. More specifically, it necessarily takes a long time before the achievement of power saving of the computer room. In Patent Document 4, since power budgets are lent and borrowed between servers close to each other so as to approach to an ideal temperature distribution, this does not mean that a total power of the server group is reduced. More specifically, this does not lead to comprehensive power saving of the computer room.

As described above, the conventional technologies have the problem that only local power saving can be achieved and it takes a long time before the achievement of power saving.

An object of the present invention is to achieve power saving in a computer room including information processing devices and air conditioners in a short time by means of the optimization of workload allocation to the information processing devices.

Means for Solving the Problems

The present invention has the following features in order to achieve power saving in a computer room including information processing devices and air conditioners by means of the optimization of workload allocation.

A feature of a representative embodiment is to calculate a coefficient of performance of the air conditioner with respect to an information processing device. Generally, a coefficient of performance COP of an air conditioner is a heat-transfer efficiency of an air conditioner when the air conditioner is operated to exchange the heat in a computer room, and it is represented by the Formula 1.

COP=heat exchange capability/air conditioner power        (Formula 1)

The coefficient of performance of an air conditioner with respect to an information processing device is a COP when an air conditioner exchanges the heat generation of a specific information processing device, and here it is referred to as a device-specific COP. A $COP_{ji}$ that is a device-specific COP of an air conditioner $j$ with respect to an information processing device $i$ is represented by the Formula 2 by using a heat generation amount $PD_i$ of the information processing device $i$ and an air conditioner power $PC_{ji}$ of the air conditioner $j$ with respect to the information processing device $i$.

$$COP_{ji} = PD_i / PC_{ji} \qquad \text{(Formula 2)}$$

Generally, since heat diffuses, the device-specific COP lowers as a distance between the air conditioner and the information processing device increases. Given that heat diffusion depends on airflow, air volume and temperature, it is necessary to obtain the device-specific COP from a result of three-dimensional thermofluid simulation or the like. However, the device-specific COP may be obtained in another way. As an example, when the matter is simplified and it is assumed that heat diffuses two-dimensionally and the device-specific COP is inversely proportional to the square of the distance between the air conditioner and the information processing device, the $COP_{ji}$ that is the device-specific COP of the air conditioner $j$ with respect to the information processing device can be represented by the Formula 3 by using a distance $L_{ji}$ between the air conditioner $j$ and the information processing device $i$, a coefficient of performance $COP_j$ that is specific to the air conditioner $j$ and an environment constant A. The coefficient of performance $COP_j$ of an air conditioner can be obtained from the specification of the air conditioner $j$, and the distance $L_{ji}$ can be obtained from arrangement information including locations of the air conditioners and a group of the information processing devices in the computer room.

$$COP_{ji} = (A/L_{ji}^2) \times COP_j \qquad \text{(Formula 3)}$$

By the device-specific COP, an air conditioner power with respect to a certain information processing device can be calculated. In a case where one air conditioner $j$ deals with the heat generation of the information processing device $i$, when it is assumed that an amount of heat generation of an information processing device is equal to device power, an air conditioner power $PC_{ji}$ of the air conditioner $j$ with respect to the information processing device $i$ can be represented by the Formula 4 by using a device power $PD_i$ of the information processing device $i$ and the $COP_{ji}$. Furthermore, in a case where a plurality of air conditioners deal with the heat generation of the information processing device $i$, when it is assumed that an amount of heat generation of an information processing device dealt with by the air conditioners is proportional to a $COP_j$ $i$ ratio of each air conditioner, an air conditioner power $PC_i$ with respect to the information processing device $i$ can be represented by the Formula 5 by using the number of air conditioners N, the $PD_i$, and the $COP_{ji}$.

$$PC_{ji} = PD_i / COP_{ji} \qquad \text{(Formula 4)}$$

[Formula 5]

$$PC_i = \sum_j (PD_i / COP_{ji}) / N \qquad \text{(Formula 5)}$$

Another feature is to create a device-associated power consumption expression that is a total of device power and air conditioner power with respect to each information processing device. A device-associated power consumption expression $P_i(x)$ of the information processing device $i$ can be represented by the Formula 6 by using a device power expression $PD_i(x)$ of the information processing device $i$ and an air conditioner power $PC_i(x)$ with respect to the information processing device $i$.

$$Pi(x) = PDi(x) + PCi(x) \quad \text{(Formula 6)},$$

Here, PDi(x) and PCi(x) are functions of a resource utilization ratio x of an information processing device. When the information processing device is a server device, the resource utilization ratio is mainly a CPU utilization ratio and a memory utilization ratio. When the information processing device is a storage device, the resource utilization ratio is mainly a disk region utilization ratio. The Pi(x) represents a total of device power and air conditioner power, and position information of the air conditioner and the group of information processing devices in the computer room is taken into account for the air conditioner power. More specifically, by using the Pi(x), the evaluation of power consumption with taking the position information in the computer room into account is possible without thinking of the position information in the computer room.

Still another feature is to calculate power consumption of the entire computer room by device-associated power consumption expression of each information processing device. Since the device-associated power consumption expression Pi(x) of the information processing device i includes device power and air conditioner power with respect to the device, it is possible to obtain power consumption of the entire computer room by totalizing the device-associated power consumption expression Pi(x) of each information processing device in the computer room. A power consumption P(x) of the entire computer room can be represented by the Formula 7.

[Formula 7]

$$P(x) = \sum_j (P_i(x)) \quad \text{(Formula 7)}$$

Still another feature is to determine workload allocation so as to achieve power saving of the entire computer room by using a power saving performance evaluation index based on the device-associated power consumption expression of an information processing device. A workload in a server device includes an operation of an application or a virtual OS, response to a client to be connected and the like. Also, a workload of a storage device is a disk storage region or the like. Further, a workload of a network device is a network throughput or the like. The power saving performance evaluation index is defined as processing performance per power consumption when the resource utilization ratio of the information processing device is at a resource utilization ratio maximum value. The processing performance in a server device is a performance value of a benchmark such as SPEC or the number of transactions per unit time. The processing performance in a storage device is, for example, a disk storage region. The resource utilization ratio maximum value is a maximum value of resource utilization ratio of a corresponding information processing device, and an administrator determines the resource utilization ratio maximum value based on a use policy of the corresponding information processing device.

When it is assumed that the processing performance of the information processing device i is proportional to the resource utilization ratio, a power saving performance evaluation index EEi with respect to the information processing device i can be represented by the Formula 8 by using a resource utilization ratio maximum value Xi and a processing performance maximum value Wi of the information processing device i.

$$EEi = Xi \times Wi / Pi(Xi) \quad \text{(Formula 8)},$$

Here, EEi is a constant, and a larger constant value indicates better performance-to-power consumption characteristics of the information processing device i. The power consumption shown here is a total value of the device power and the air conditioner power with respect to the information processing device i. More specifically, by allocating workload preferentially to the information processing device i having a large power saving performance evaluation index EEi, workload allocation that minimizes the power consumption of the entire computer room is possible. When workload allocation is performed according to this policy, there appears a bipolar phenomenon in which the resource utilization ratio of an information processing device having a large power saving performance evaluation index comes closer to a maximum resource utilization ratio while the resource utilization ratio of an information processing device having a small power saving performance evaluation index comes closer to zero. The power saving performance evaluation index EEi evaluates the power saving performance when the resource utilization ratio of an information processing device is at the resource utilization ratio maximum value with taking the bipolar phenomenon into account.

Still another feature is to control a workload operated in each information processing device based on a result of workload allocation. For its achievement, a group of information processing devices has a workload control agent, and the workload control agent controls a workload operated in the information processing device in accordance with the result of workload allocation.

Still another feature is to calculate an air conditioner power from the device-specific COP and a measured device power value of an information processing device. When it is assumed that an amount of heat generation of an information processing device dealt with by an air conditioner is proportional to a COPji ratio of each air conditioner, an air conditioner power PCj of the air conditioner j can be represented by the Formula 9 by using the number of air conditioners N, the measured device power value PDi of the information processing device i and the COPji.

[Formula 9]

$$PCj = \sum_i (PDi / COPji) / N \quad \text{(Formula 9)}$$

Still another feature is to control an output of each air conditioner based on a result of the above-described air conditioner power calculation. In order to control the output of each air conditioner, the air conditioner has an output control agent, and the output control agent controls the output of the air conditioner based on an instruction of an operation management device.

Effects of the Invention

Since the total power consumption of a group of information processing devices and air conditioners in a computer room can be reduced by the workload allocation taking into account the air conditioners, power saving operation of a data center can be achieved. Furthermore, since determination of workload allocation to the group of information processing devices does not depend on output of the air conditioner, it is unnecessary to sequentially repeat workload allocation and power measurement, and power saving can be achieved in a short time.

BRIEF DESCRIPTIONS OF THE DRAWINGS

FIG. 3 is a conceptual diagram showing an information processing device specification table of the first embodiment;

FIG. 4 is a conceptual diagram showing an air conditioner specification table of the first and third embodiments according to the present invention;

FIG. 5 is a conceptual diagram showing a workload specification table of the first embodiment;

FIG. 6 is a conceptual diagram showing a workload allocation table of the first embodiment;

FIG. 9 is a conceptual diagram showing an output result of a device-specific COP calculating step of the first embodiment;

FIG. 10 is a conceptual diagram showing an output result of a device-associated power consumption expression creating step of the first embodiment;

FIG. 11 is a conceptual diagram showing an output result of a device evaluation index calculating step of the first embodiment;

FIG. 14 is a conceptual diagram showing an information processing device specification table of the second embodiment;

FIG. 15 is a conceptual diagram showing a workload specification table of the second embodiment;

FIG. 16 is a conceptual diagram showing an output result of a device-specific COP calculating step of the second embodiment;

FIG. 17 is a conceptual diagram showing an output result of a device-associated power consumption expression creating step of the second embodiment;

FIG. 18 is a conceptual diagram showing an output result of a device evaluation index calculating step of the second embodiment;

FIG. 19 is a conceptual diagram showing a workload allocation table of the second embodiment;

FIG. 22 is a conceptual diagram showing an air conditioner power table of the third embodiment;

BEST MODE FOR CARRYING OUT THE INVENTION

Embodiments of the present invention will be described below with reference to the drawings.

First Embodiment

Figure 1:
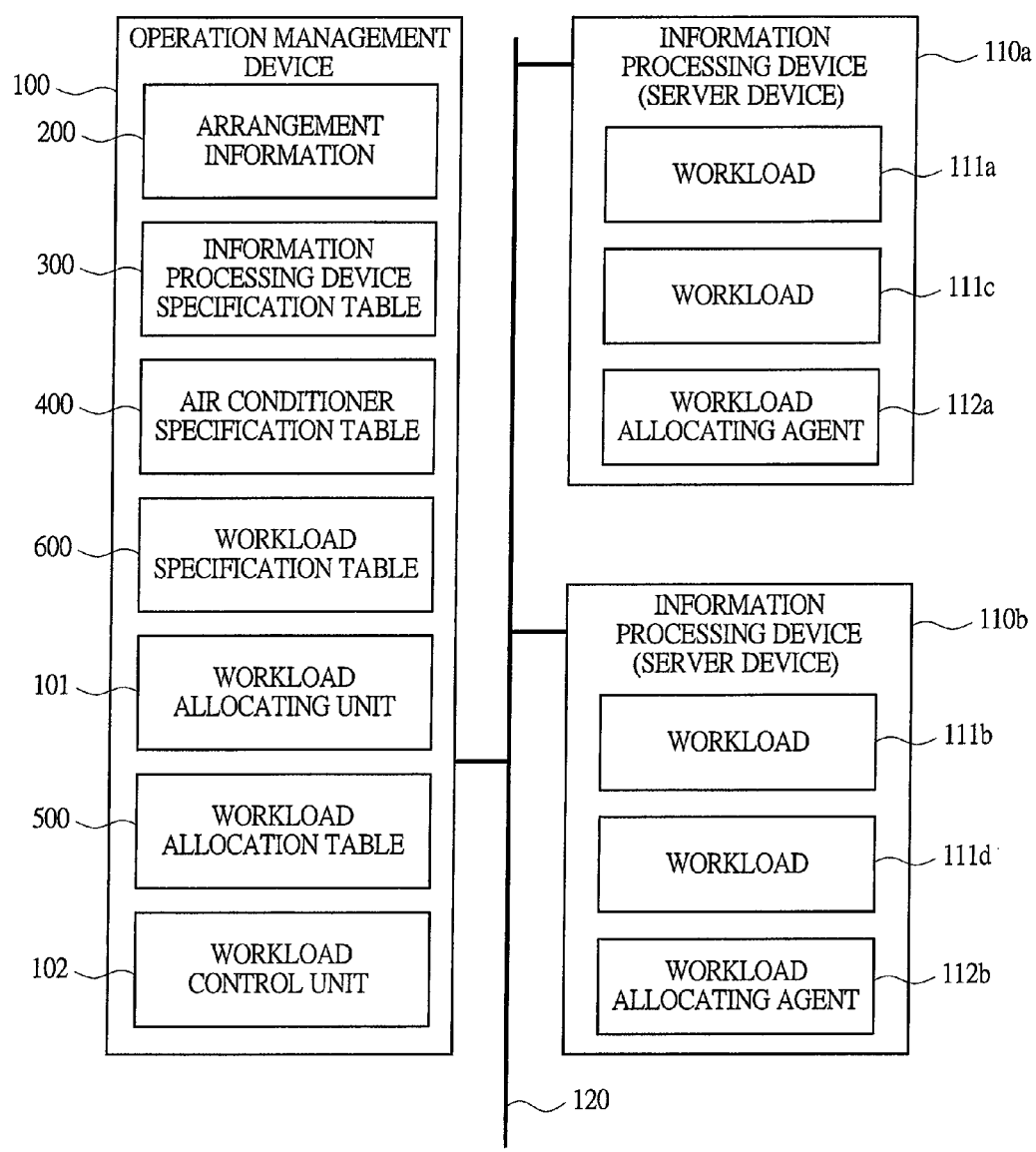
FIG. 1 is a block diagram showing a system configuration of an operation management device and a server device of a first embodiment of the present invention.

FIG. 1 is a block diagram of a first embodiment of the present invention. In the present embodiment, when an information processing device is a server device, the workload allocation to server devices capable of saving the power in an entire computer room is achieved. Though this embodiment shows a case where two server devices are provided as information processing devices, the number of server devices may be any number. Furthermore, as the information processing device, a storage device or a network device may coexist with the server device. In this embodiment, an operation management device 100 and server devices 110a and 110b are connected to each other via a network 120.

When the information processing devices are server devices, workloads 111a to 111d correspond to an OS on a virtual machine and an application for a web server, a DB server or the like. Workload allocating agents 112a and 112b receive instructions from the operation management device 100 and control the workloads 111a to 111d on the server devices 110a and 110b. The workload allocating agents may be provided in the server devices 110a and 110b as shown in FIG. 1 or may be disposed outside the server devices 110a and 110b. For example, when the workload is an OS on a virtual machine, the workload allocating agent is a virtual OS manager, and it is provided in the server device. On the other hand, when the workload is a server application, the workload allocating agent is a load balancer, and it is disposed outside the server device.

The operation management device 100 is provided with arrangement information 200, an information processing device specification table 300, an air conditioner specification table 400, a workload specification table 600, a workload allocation table 500, a workload allocating unit 101 and a workload control unit 102. These components may be arranged within the single operation management device 100 as shown in FIG. 1 or may be arranged in a plurality of devices in a distributed manner.

Figure 2:
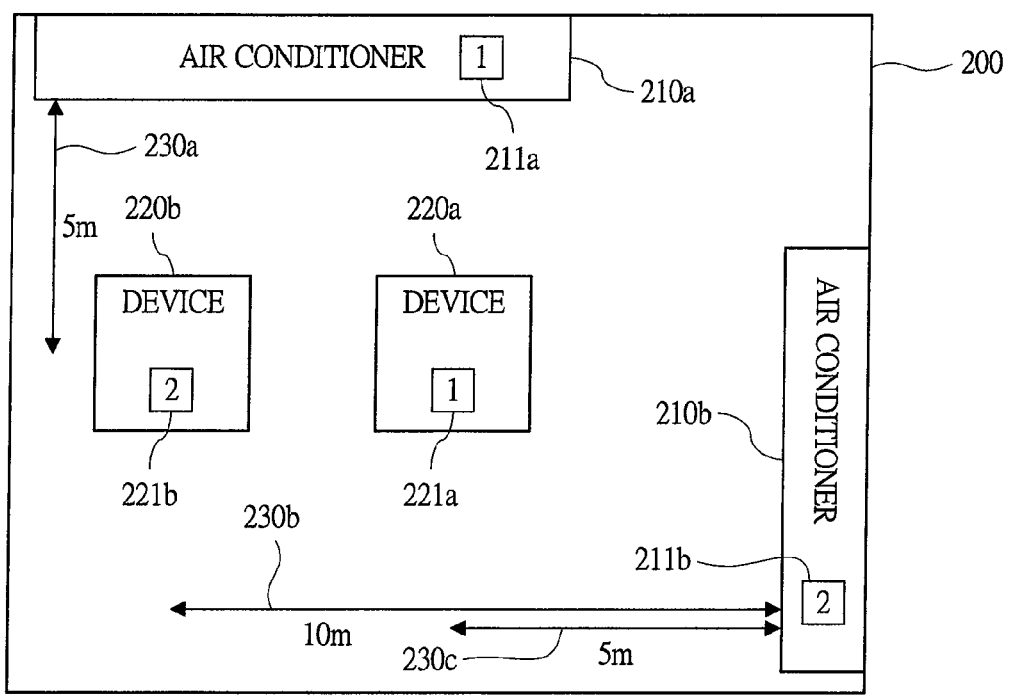
FIG. 2 is a plan view showing arrangement information of the first embodiment.

FIG. 2 shows an example of arrangement of devices in a computer room. When air conditioners 210a and 210b and server devices 220a and 220b are arranged in a computer room as shown in FIG. 2, the above-described arrangement information 200 set in the operation management device 100 has to include device IDs 221a and 221b of the server devices 220a and 220b, air conditioner IDs 211a and 211b of the air conditioners associated with operational environments of the respective server devices, and pieces of relative distance information 230a to 230c between the server devices and the air conditioners 210a and 210b. The arrangement information 200 may be in a graphic form as shown in FIG. 2 or may be in a table form.

The information processing device specification table 300 shown in FIG. 3 holds a device type 320, a device power minimum value PDmini 330, a device power maximum value PDmaxi 340, a processing performance maximum value Wi 350, an allocable processing performance 360, a resource utilization ratio maximum value Xi 370 and a device power expression PDi(x) 380 for each device ID 310 with respect to the information processing devices in the computer room. The device ID 310 is an identifier for identifying the information processing devices 220a and 220b in the computer room. The device type 320 is a piece of information for identifying types of the information processing devices. The device power minimum value PDmini 330 and the device power maximum value PDmaxi 340 are an idle-state device power and a maximum rated power of the information processing device, respectively. The device power minimum value PDmini 330 and the device power maximum value PDmaxi 340 are values specific to each information processing device and are specified in a catalogue or the like. In this embodiment, an increase amount of the device power of the information processing device is assumed to be proportional to the resource utilization ratio, and the device power expression PDi(x) of an information processing device i is represented by the Formula 10 by using PDmini, PDmaxi and a resource utilization ratio x. However, the device power expression PDi(x) may be a constant for simplification or may be represented by an expression different from the Formula 10, which obtained by approximating a measured result of power consumption of the information processing device.

$$PDi(x)=PDmini+(PDmaxi-PDmini) \times X/100 \quad \text{(Formula 10)}$$

The processing performance maximum value Wi 350 in a server device is a maximum value of arithmetic processing performance of the server device, and a performance value of a benchmark such as SPEC or the maximum value of the number of transactions per unit time of a certain application is used. The allocable processing performance 360 is processing performance to which workload can be allocated, and it is equal to the processing performance maximum value Wi when no workload is allocated. Furthermore, the resource utilization ratio maximum value Xi 370 in the server device is an allocation maximum value of CPU utilization ratio and a memory utilization ratio of the server device, and it is set by an administrator according to a use policy of the server device. For example, when power saving performance is given priority, the resource utilization ratio maximum value is set high so that more workloads are consolidated in the server device. On the other hand, when service continuity is given priority, the resource utilization ratio maximum value is set low so that a workload is allocated with room left in the resource of the server device.

The air conditioner specification table 400 shown in FIG. 4 holds an air conditioner COP 420 for each air conditioner ID 410 with respect to the air conditioners in the computer room. The air conditioner ID 410 is an identifier for identifying the air conditioners 210a and 210b in the computer room. The air conditioner COP 420 is specified in a catalogue or the like.

The workload specification table 500 shown in FIG. 5 holds an allocation target device type 520, a workload amount 530 and an allocation policy 540 for each workload ID 510 with respect to the workloads. The workload ID 510 is a piece of information for identifying workloads executed in the computer room. The allocation target device type 520 is a piece of information showing a type of information processing device to which a corresponding workload can be allocated. The workload amount 530 in the server device is an expected value of arithmetic processing performance of the server device that is required for the operation of a corresponding workload, and it is represented by using the same reference as the processing performance maximum value 350. The allocation policy 540 is a piece of information referred to when the workload allocating unit 101 determines workload allocation. In FIG. 5, service priority and power saving priority are specified as allocation policies, but another allocation policy may be used or no allocation policy may be used.

The workload allocation table 600 shown in FIG. 6 is a table showing a relationship between each workload and the information processing device to which the workload is allocated. The workload is identified by using a workload ID 610, and the information processing device of an allocation destination is identified by an allocated device ID 620.

Figure 7:
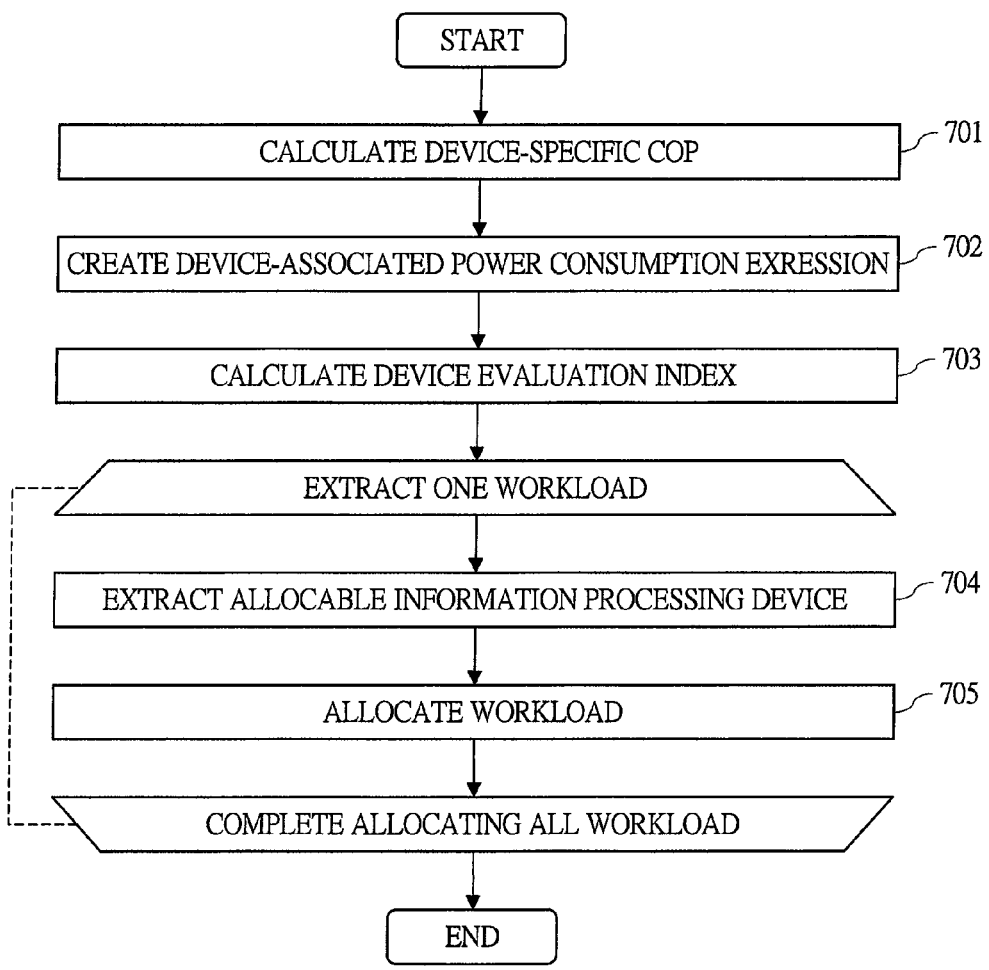
FIG. 7 is a flowchart showing processing in a workload allocating unit in a case where a device-specific COP is constant.

FIG. 7 shows a processing flow in the workload allocating unit. This processing flow includes a device-specific COP calculating step 701, a device-associated power consumption expression creating step 702, a device evaluation index calculating step 703, an allocable information processing device extracting step 704 and a workload allocating step 705, in which the arrangement information 200, the information processing device specification table 300, the air conditioner specification table 400 and the workload specification table 500 are taken as inputs and the workload allocation table 600 is output. The allocable information processing device extracting step 704 and the workload allocating step 705 are processes performed to all workloads, and are performed for each workload.

At the device-specific COP calculating step 701, the arrangement information 200 is taken as an input and an output result 900 shown in FIG. 9 is output. The output result 900 holds a distance 930 from each information processing device and a device-specific COP 940 of each information processing device with respect to each air conditioner. The air conditioners are identified by air conditioner IDs 910, and the information processing devices are identified by device IDs 920. A distance Lji 930 between an air conditioner j and an information processing device i is calculated by analyzing the arrangement information 200. Calculation of a COPj 940 that is a device-specific COP uses the Formula 3. In this embodiment, the environment constant A in the Formula 3 is set so that an average of the COPji of the air conditioners j becomes a COPj. However, the device-specific COP or the environment constant A may be obtained by an experiment in the computer room or may be obtained based on a three-dimensional thermofluid simulation. For example, an air conditioner power with respect to a device power can be obtained by using a three-dimensional thermofluid simulation or a high-speed simulation engine in which main parameters are extracted based on a three-dimensional thermofluid simulation, and a device-specific COP can be calculated from the air conditioner power. Incidentally, a device temperature can be obtained from the device power when these simulations are used.

At the device-associated power consumption expression creating step 702, the information processing device specification table and COPji are taken as inputs, and a device-associated power consumption expression of each information processing device is output. FIG. 10 shows an output result 1000 of the device-associated power consumption expression creating step 702. The output result 1000 holds a device-associated power consumption expression 1020 for each device ID 1010. The device-associated power consumption expression 1020 is calculated by utilizing the Formula 4, the Formula 5 and the Formula 6.

At the device evaluation index calculating step 703, the device-associated power consumption expression 1020 and the information processing device specification table 300 are taken as inputs, and an evaluation index of each information processing device is output. FIG. 11 shows an output result 1100 at the device evaluation index calculating step 703. In this embodiment, a power saving performance evaluation index EEi 1120 and a service continuity evaluation index ESi 1130 are used as evaluation indexes of each information processing device. The power saving performance evaluation index EEi 1120 is a constant calculated based on the Formula 8, and it indicates the performance per associated power consumption in the maximum resource utilization ratio of the information processing device i. Since EEi is a power saving performance evaluation index taking into account the air conditioner power and the arrangement information of the computer room, workload allocation capable of reducing the power consumption of the entire computer room can be determined by allocating workloads to the server devices in descending order of EEi values. The service continuity evaluation index ESi 1130 is a constant calculated based on the Formula 11, and it indicates an available resource amount of an information processing device in maximum resource utilization ratio of the information processing device i. Workload allocation having room left in the information processing devices can be determined by allocating workloads to the server devices in descending order of ESi values. In this embodiment, the two evaluation indexes EEi and ESi with respect to each information processing device are used, but only the power saving performance evaluation index EEi may be used or another evaluation index may be used.

$$ESi = Wi \times (100 - Xi)/100 \quad \text{(Formula 11)}$$

At the allocable information processing device extracting step 704, the workload specification table 500 and the information processing device specification table 300 are taken as inputs, and an information processing device to which a workload can be allocated is extracted. Specifically, an information processing device whose device type 320 is identical to the allocation target device type 520 and whose allocable processing performance 360 is larger than the workload amount 530 is extracted with reference to the allocation target device type 520 and the workload amount 530 of the workload, and the device type 320 and the allocable processing performance 360 of the information processing device. The information processing device includes a resource required to be secured in the workload allocation in addition to the allocable processing performance 360. For example, when the information processing device is a server device, the resource corresponds to a disk storage region, the number of licenses of an OS or application or the like, and when the information processing device is a storage device, the resource corresponds to the number of connected clients. These resources do not appear in the Formula 8 and the Formula 11, but are factors in determining whether to perform allocation. In this embodiment, the processing is shown based on an assumption that these resources are sufficiently secured, but the workload specification table 500 or the information processing device specification table 300 may hold the information of these resources so that the information can be used as a restriction condition in the extraction of the information processing device.

At the workload allocating step 705, the information processing device to be an allocation destination of the workload is determined in accordance with the allocation policy from the information processing device extracted at the allocable information processing device extracting step 704 and the output result 1100 at the device evaluation index calculating step. FIG. 6 shows the workload allocation table 600 that is an output result of the workload allocating step 705. At the workload allocating step 705, when the allocation policy is power saving priority, an information processing device having the highest power saving performance evaluation index EEi is determined as the information processing device to be the allocation destination of the workload, and when the allocation policy is service priority, an information processing device having the highest service continuity evaluation index ESi is determined as the information processing device to be the allocation destination of the workload. After the information processing device to be the allocation destination of the workload is determined, the workload amount 530 of the workload is subtracted from a value of the allocable processing performance 360 of the corresponding information processing device.

Figure 8:
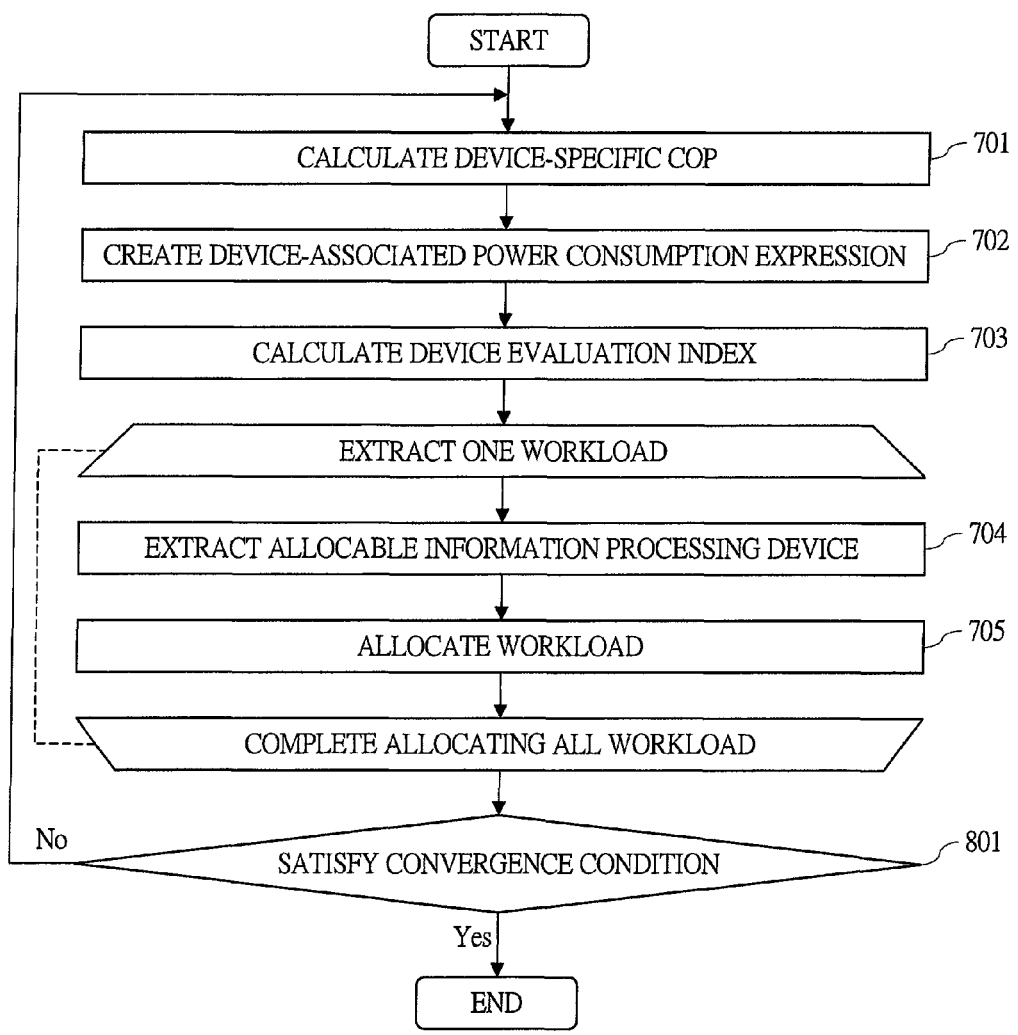
FIG. 8 is a flowchart showing processing in the workload allocating unit in a case where the device-specific COP varies in accordance with an environment.

The processing flow of the workload allocating unit has been described above. However, when the device-specific COP is not as simple as that represented by the Formula 3 or varies in accordance with an environment in the computer room, the device-specific COP calculating step 701 to the workload allocating step 705 may be repeated until a convergence condition is satisfied like the processing flow shown in FIG. 8. For example, when a device-specific COP is obtained by a three-dimensional thermofluid simulation, a sequence of processes of obtaining device power distribution that is input information of the three-dimensional thermofluid simulation at the workload allocating step 705 and calculating a device-specific COP based on the obtained distribution at the device-specific COP calculating step 701 is repeated until the convergence condition is satisfied. The convergence condition at a convergence condition determination 801 is that a difference in device-specific COP from the last calculation result is within a threshold, a result of workload allocation is equal to the last workload allocation result and the like. Furthermore, a restriction condition that a device temperature obtained by a three-dimensional thermofluid simulation or a high-speed simulation engine does not exceed an operational upper limit temperature of the information processing device or a temperature obtained by subtracting a margin from the operational upper limit temperature may be added in the workload allocating step 705. Incidentally, the flow of the workload allocating unit shown in FIG. 8 is also applicable to the case where the amount of heat generation of an information processing device is influenced by heat generated from an adjacent information processing device, the case where the device power of the information processing device is influenced by the temperature in the computer room and the like.

The workload control unit 102 uses the workload allocation table 600 to control the workloads 111a to 111d of the information processing devices 110a and 110b. This control varies depending on the types of the information processing devices. When the information processing device is a server device, the workload control unit 102 changes settings of a virtual OS manager and a workload balancer corresponding to the workload allocating agents 112a and 112b, and allocates workloads to the server devices based on the workload allocation table 600.

As described above, the workload allocation capable of saving the power of the computer room can be achieved by determining an optimum allocation of workloads to the server devices with taking into account the air conditioner power and controlling the workloads on the server devices in accordance with the allocation.

Second Embodiment

Figure 12:
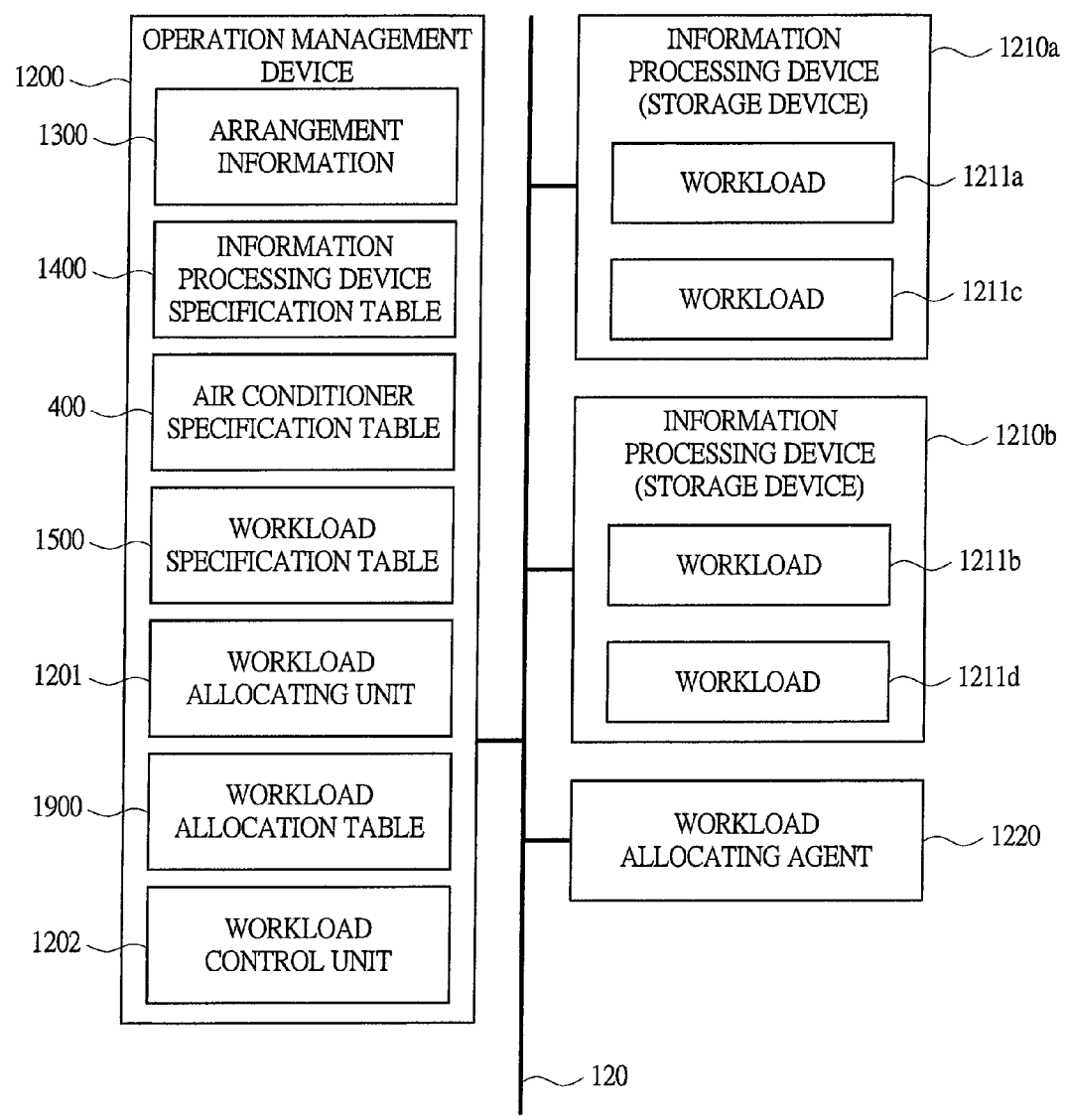
FIG. 12 is a block diagram showing a configuration of a second embodiment of the present invention.

FIG. 12 is a diagram showing a second embodiment of the present invention. In the present embodiment, when the information processing device is a storage device, the workload allocation capable of saving the power in the entire computer room can be achieved. Though this embodiment shows a case where two storage devices are provided as information processing devices, the number of storage devices may be any number. Furthermore, as the information processing device, a server device or a network device may coexist with the storage device. In this embodiment, an operation management device 1200, storage devices 1210a and 1210b and a workload allocating agent 1220 are connected to each other via the network 120.

When the information processing devices are storage devices, workloads 1211a to 1211d are data storage regions. The workload allocating agent 1220 receives instructions from the operation management device and controls the data storage regions of the storage devices. The workload allocating agent 1220 for the storage devices is a storage manager and is generally disposed outside the storage devices.

The operation management device 1200 shown in FIG. 12 is provided with arrangement information 1300, an information processing device specification table 1400, the air conditioner specification table 400, a workload specification table 1500, a workload allocation table 1900, a workload allocating unit 1201 and a workload control unit 1202. Hereinafter, the arrangement information 1300, the information processing device specification table 1400, the workload specification table 1500, the workload allocating unit 1201 and the workload control unit 1202 which are differences from the first embodiment will be described.

Figure 13:
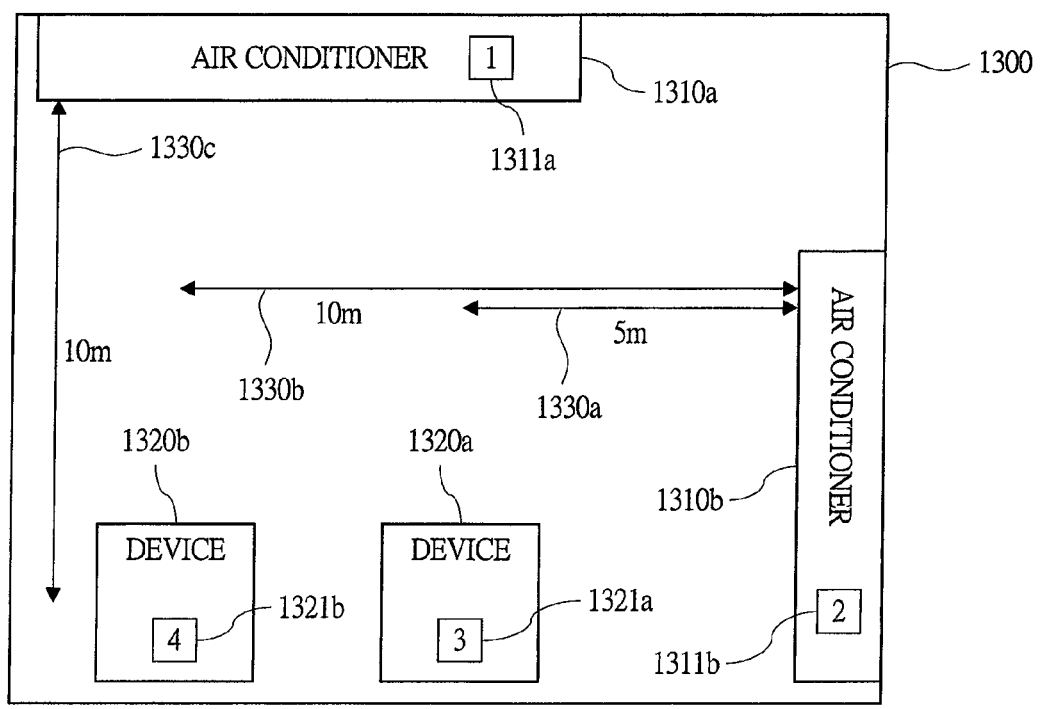
FIG. 13 is a plan view showing arrangement information of the second embodiment.

The arrangement information 1300 shown in FIG. 13 is a piece of information showing position relationships between air conditioners 1310a and 1310b and storage devices 1320a and 1320b in the computer room. Air conditioner IDs 1311a and 1311b are assigned to the air conditioners 1310a and 1310b, respectively, and device IDs 1321a and 1321b are assigned to the storage devices 1320a and 1320b, respectively. The arrangement information includes pieces of relative distance information 1330a to 1330c between the air conditioners 1310a and 1310b and the storage devices 1320a and 1320b. The arrangement information may be in a graphic form shown in FIG. 13 or may be in a table form as long as the relative distances between the air conditioners and the storage devices can be understood.

The information processing device specification table 1400 shown in FIG. 14 holds a device type 1420, a device power minimum value PDmini 1430, a device power maximum value PDmaxi 1440, a processing performance maximum value Wi 1450, an allocable processing performance 1460, a resource utilization ratio maximum value Xi 1470 and a device power expression 1480 for each device ID 1410 with respect to the storage devices in the computer room. When the information processing device is a storage device, the processing performance maximum value Wi 1450 is a maximum value of a data storage region of the storage device, and it is specified in a catalogue or the like. The resource utilization ratio maximum value Xi 1470 is a maximum value of utilization ratio of the data storage region of the storage device, and it is referred to by the workload allocating unit 1201 in the workload allocation.

The workload specification table 1500 shown in FIG. 15 holds an allocation target device type 1520 and a workload amount 1530 for each workload ID 1510 with respect to the workloads. The workload amount 1530 in the storage device is a size of the data storage region required by a corresponding workload. In the workload specification table 1500, an allocation policy is not specified, but an allocation policy may be specified like in the workload specification table 500 of the first embodiment.

A processing flow of the workload allocating unit 1201 in this embodiment is the same as the processing flow 700 of the workload allocating unit of the first embodiment. At the device-specific COP calculating step 701 in this embodiment, the arrangement information 1300 and the air conditioner specification table 400 are taken as inputs, and a device-specific COP for each air conditioner shown in an output result 1600 is output.

At the device-associated power consumption expression creating step 702 in this embodiment, the information processing device specification table 1400 and the output result 1600 of the device-specific COP calculating step are taken as inputs, and a device-associated power consumption expression of each information processing device shown in an output result 1700 is output. In this embodiment, the device power of the storage device is assumed to be constant regardless of the resource utilization ratio, and a device-associated power consumption expression Pi(x) is obtained by fixing the device power expression PDi(x) of the storage device at the device power maximum value PDmaxi. However, on an assumption that the storage device adopts an MAID (Massive Arrays of Inactive Disks) technology for performing power control in accordance with a used storage region, the device power expression PDi(x) and the device-associated power consumption expression Pi(x) may be obtained so that the device power increases or decreases in accordance with the resource utilization ratio.

At the device evaluation index calculating step 703 in this embodiment, the device-associated power consumption expression 1700 and the information processing device specification table 1400 are taken as inputs, and an evaluation index for each storage device shown in an output result 1800 is output. In this embodiment, only the power saving performance evaluation index EEi is output. However, other evaluation indexes may be output as described in the first embodiment.

At the allocable information processing device extracting step 704 and the workload, allocating step 705 in this embodiment, the evaluation index 1800 for each information processing device, the workload specification table 1500 and the information processing device specification table 1400 are taken as inputs, and the workload allocation table 1900 shown in FIG. 19 is output. In the evaluation index 1800 of each information processing device, the power saving performance evaluation index EEi of the storage device 1320a whose device ID is 3 is higher than that of the storage device 1320b whose device ID is 4, and therefore, workloads with respect to the storage devices are intensively allocated to the storage device 1320a in the workload allocation table 1900. This indicates that the power of the computer room including the air conditioner power can be saved by the intensive allocation of workloads to the storage device 1320a.

The workload control unit 1202 controls a workload of each of the information processing devices 1210a and 1210b by using the workload allocation table 1900. This control varies depending on the types of the information processing devices. When the information processing device is a storage device, the workload control unit changes settings of the storage manager corresponding to the workload allocating agent 1220, and allocates a data storage region that is a workload of each storage device based on the workload allocation table 1900.

As described above, the workload allocation capable of saving the power of the computer room can be achieved by determining an optimum allocation of workloads to the storage devices with taking into account the air conditioner power and controlling the workloads on the storage devices in accordance with the allocation.

Third Embodiment

Figure 20:
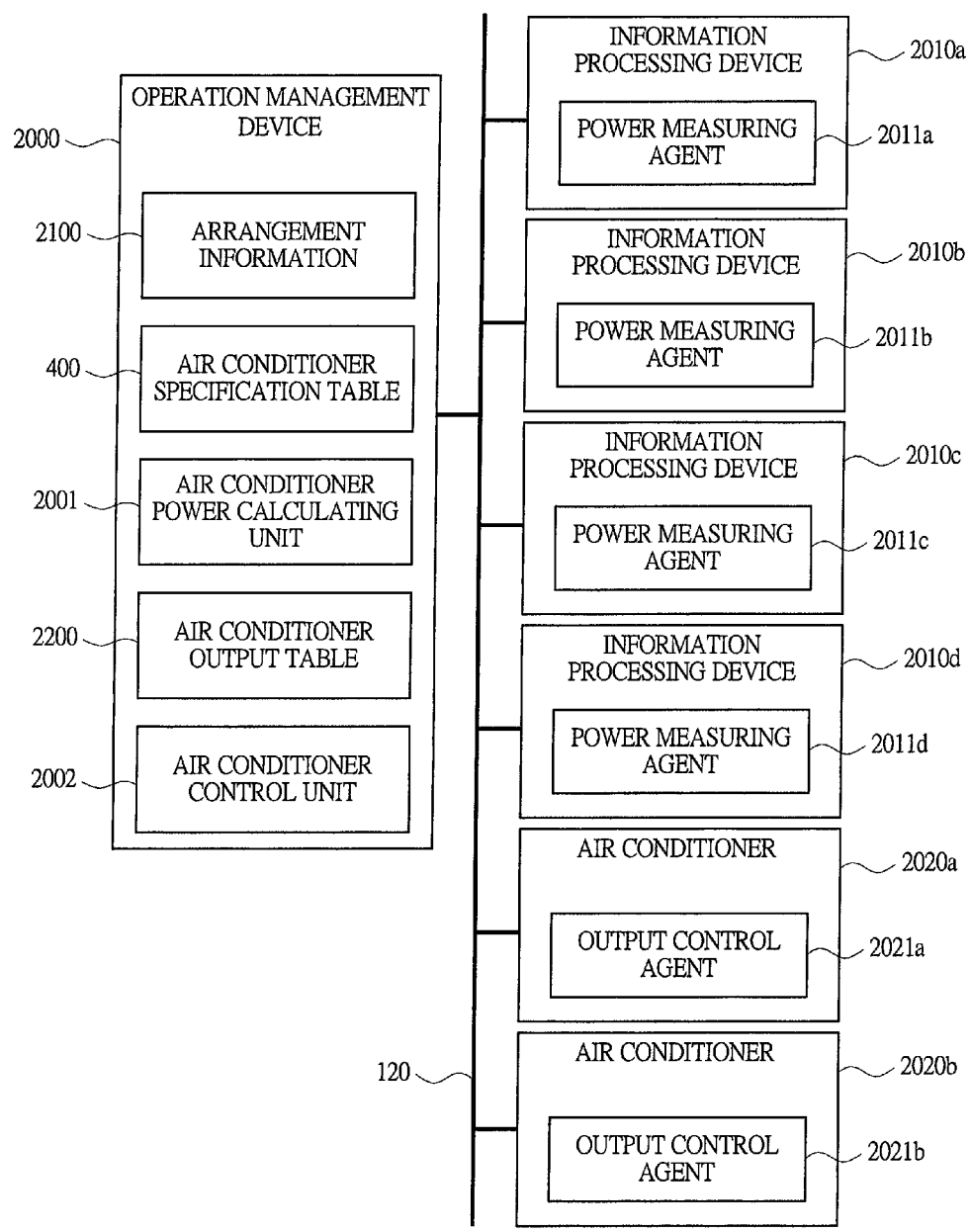
FIG. 20 is a block diagram showing a configuration of a third embodiment of the present invention.

FIG. 20 is a diagram showing a third embodiment of the present invention. In the present embodiment, an air conditioner power required for cooling information processing devices 2010a to 2010d in a computer room is obtained, and air conditioners 2020a and 2020b are controlled in accordance with the obtained air conditioner power, thereby saving the power of an entire computer room. Though this embodiment shows a case where four information processing devices and two air conditioners are provided, the numbers of information processing devices and air conditioners may be any number. This embodiment may be implemented in parallel with the first embodiment and the second embodiment or may be performed independently. In this embodiment, an operation management device 2000, the information processing devices 2010a to 2010d, the air conditioners 2020a and 2020b are connected to each other via the network 120.

The information processing devices 2010a to 2010d in the computer room are provided with power measuring agents 2011a to 2011d. The power measuring agents 2011a to 2011d measure the device power of the information processing devices and transmit the results of the measurements to the operation management device 2000.

The air conditioners 2020a and 2020b are provided with output control agents 2021a and 2021b. The output control agents 2021a and 2021b control outputs of the air conditioners 2020a and 2020b in accordance with requests from the operation management device 2000.

The operation management device 2000 is provided with arrangement information 2100, the air conditioner specification table 400, an air conditioner power table 2200, an air conditioner power calculating unit 2001 and an air conditioner control unit 2002.

Figure 21:
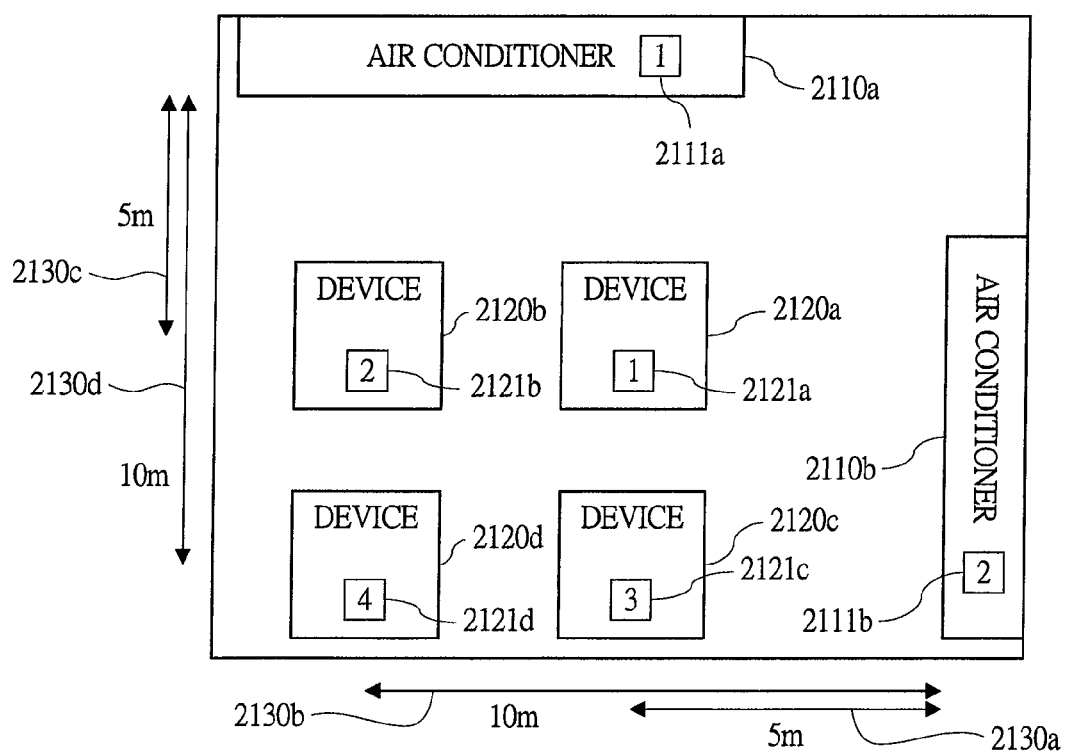
FIG. 21 is a plan view showing arrangement information of the third embodiment.

The arrangement information 2100 shown in FIG. 21 is a piece of information showing position relationships between air conditioners 2110a and 2110b and information processing devices 2120a to 2120d in the computer room. Air conditioner IDs 2111a and 2111b are assigned to the air conditioners 2110a and 2110b, respectively, and device IDs 2121a to 2121d are assigned to the information processing devices 2120a to 2120d, respectively. The arrangement information 2100 includes pieces of information 2130a to 2130d on relative distances between the air conditioners 2110a and 2110b and the information processing devices 2120a to 2120d. The arrangement information may be in a graphic form as shown in FIG. 21 or may be in a table form as long as the relative distances between the air conditioners and the information processing devices can be understood.

The air conditioner power table 2200 shown in FIG. 22 holds an optimum air conditioner power 2250 for each of the air conditioner IDs 2210 of the air conditioners. The air conditioner power 2250 is calculated from a device power measured value 2230 and an air conditioner power expression 2240 for each of the device IDs 2220 of the information processing devices. The air conditioner power table 2200 is created by the air conditioner power calculating unit 2001, and it is referred to when the air conditioner control unit 2002 controls the outputs of the air conditioners 2110a and 2110b.

Figures 23, 24:
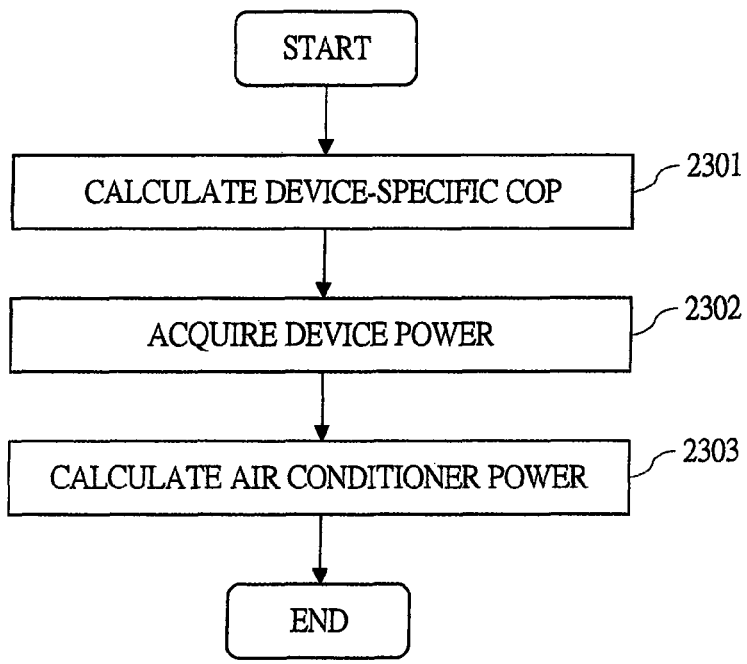
FIG. 23 is a flowchart showing processing in an air conditioner power calculating unit of the third embodiment.
FIG. 24 is a conceptual diagram showing an output result of a device-specific COP calculating step of the third embodiment.

FIG. 23 shows a processing flow of the air conditioner power calculating unit 2001. This processing flow includes a device-specific COP calculating step 2301, a device power acquiring step 2302 and an air conditioner power calculating step 2303, in which the arrangement information 2100, the air conditioner specification table 400 and the device power measured value 2230 of the information processing device are taken as inputs and the air conditioner power table 2200 is output.

The device-specific COP calculating step 2301 is the same as the device-specific COP calculating step 701 in the first embodiment. At the device-specific COP calculating step 2301, the arrangement information 2100 and the air conditioner specification table 400 are taken as inputs and a device-specific COP is output. FIG. 24 shows an output result 2400 of the device-specific COP calculating step 2301.

At the device power acquiring step 2302, the device power measured values 2230 of the information processing devices 2010a to 2010d are acquired via the respective device power measuring agents 2011a to 2011d. When the device power measured value cannot be acquired, a device power maximum value or a value calculated by using the device power expression PDi(x) may be used instead of the device power measured value.

At the air conditioner power calculating step 2303, the device power measured value 2230 and the device-specific COP 2440 of the information processing device are taken as inputs, and an air conditioner power calculated value of each air conditioner is output.

The air conditioner power table 2200 shown in FIG. 21 is an output result of the air conditioner power calculating step 2303. The air conditioner power PCj 2250 of each air conditioner is calculated by using the Formula 9. Since the air conditioner power PCj 2250 of each air conditioner is an optimum value of air conditioner power, by controlling the output of the air conditioners 2010a and 2010b based on this value, the air conditioner power of the computer room can be reduced.

The air conditioner control unit 2002 refers to the air conditioner power table 2200 and controls the outputs of the air conditioners 2020a and 2020b via the output control agents 2021a and 2021b.

As described above, the power saving of the air conditioner power of the computer room can be achieved by obtaining the air conditioner power calculated value of each air conditioner and controlling the output of each air conditioner based on the calculated value. This embodiment can be implemented in parallel with the workload allocation to the information processing devices shown in the first embodiment or the second embodiment. By implementing this embodiment in parallel with the first embodiment or the second embodiment, workload allocation to the information processing devices is optimized, and a total value of the device power and the air conditioner power of the computer room can be reduced. Furthermore, since the first embodiment or the second embodiment is independent of the result of the present embodiment, it is unnecessary to sequentially repeat the workload allocation and the power measurement, and the time to achieve the power saving can be shortened.

Fourth Embodiment

Next, an embodiment in which the determination of workload allocation to devices described in the embodiments above is executed through a screen provided for an administrator by an air conditioning visualization tool provided in an operation management device will be described with reference to FIG. 25 and FIG. 26.

Figure 25:
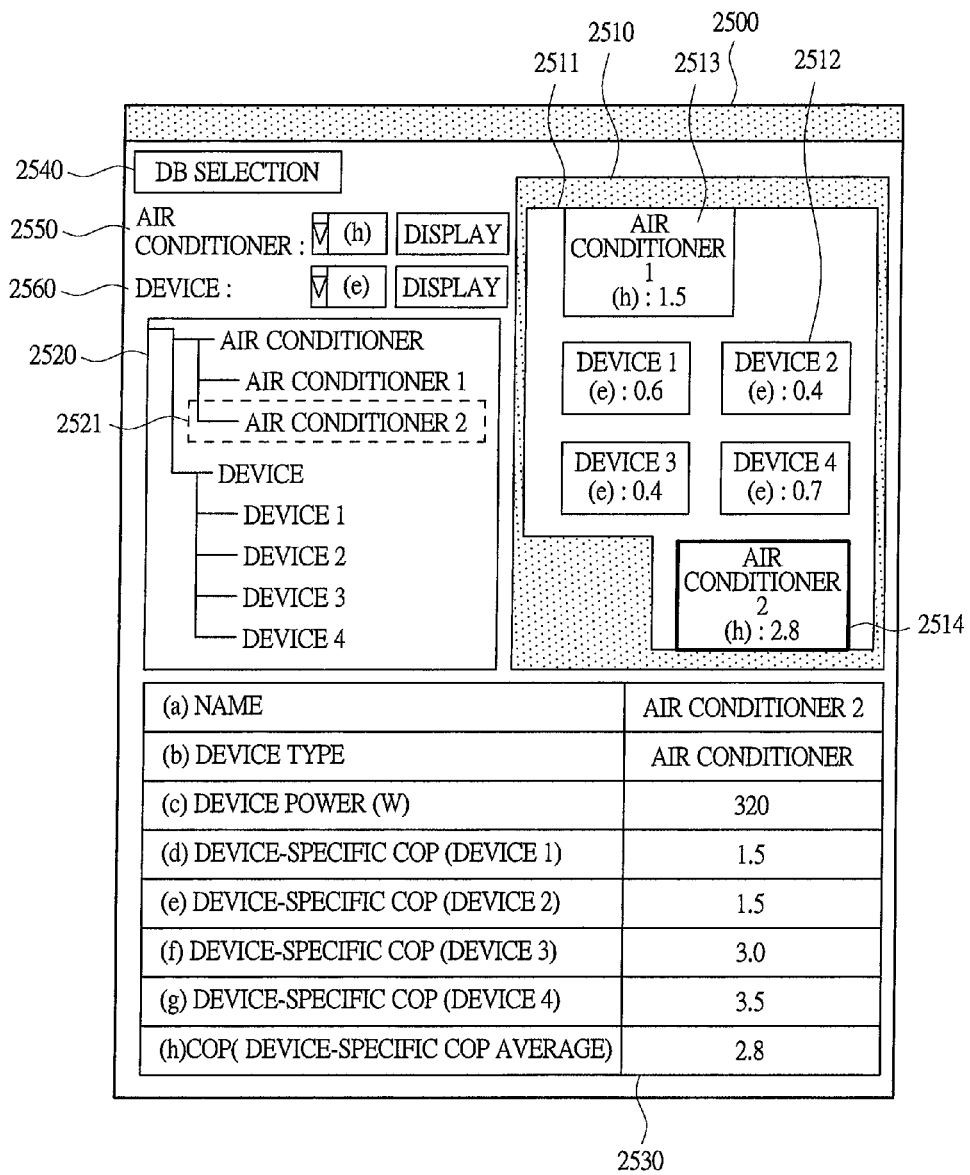
FIG. 25 shows a screen provided by an air conditioning visualization analysis tool of a fourth embodiment of the present invention.

FIG. 25 shows an example of a screen displayed by an air conditioning visualization analysis tool provided in the operation management device 100 in FIG. 1. The air conditioning visualization analysis tool displays a computer room layout display screen 2510, a device/air conditioner selection screen 2520, a detailed information screen 2530, a computer room information DB selection button 2540, an air conditioner display item selection box 2550 and a device display item selection box 2560 within a whole window 2500 so that air conditioning analysis information is provided for the administrator.

The computer room layout display screen 2510 includes a computer room layout frame 2511, device objects 2512 and air conditioner objects 2513 and 2514, and provides the administrator with the arrangement information of the air conditioners and the devices.

The device/air conditioner selection screen 2520 displays a list of devices and air conditioners in the computer room to provide the administrator with means to select a device or an air conditioner to be displayed on the detailed information screen 2530. For example, when the administrator selects "air conditioner 2" 2521, the air conditioning visualization analysis tool 2500 displays a corresponding object 2514 on the computer room layout display screen 2510 in a highlighted manner. Further, as shown in FIG. 25, detailed information of the corresponding object is displayed on the detailed information screen 2530. Also when the administrator selects the object 2514 in the computer room layout display screen 2510, the "air conditioner 2" 2521 on the device/air conditioner selection screen 2520 is displayed in a highlighted manner, and the detailed information of the corresponding object is displayed on the detailed information screen 2530. The display items of the detailed information screen 2530 include a device name, a device type, a device power, a device-specific COP and COP (an average value of device-specific COPS) relating to the selected "air conditioner 2" 2521. However, other items may be included.

The DB selection button 2540 is a button for calling a screen for selecting information of the computer room to be an object of air conditioning visualization analysis. In this embodiment, the DB selection button 2540 is in a button form, but it may be in another form.

The air conditioner display item selection box 2550 is a box by which the administrator specifies a display item associated with an air conditioner object on the computer room layout display screen 2510. The device display item selection box 2560 is similarly a box for specifying a display item associated with a device object. FIG. 25 shows the state in which an item (e) is specified in the air conditioner display item selection box 2550, and as a result, a value of COP of each air conditioner is displayed in the air conditioner objects 2513 and 2514 on the computer room layout display screen 2510. Further, an item (h) is specified in the device display item selection box 2560, and as a result, a value of resource utilization ratio of each storage device is displayed in the device objects 2512 on the computer room layout display screen 2510.

Figure 26:
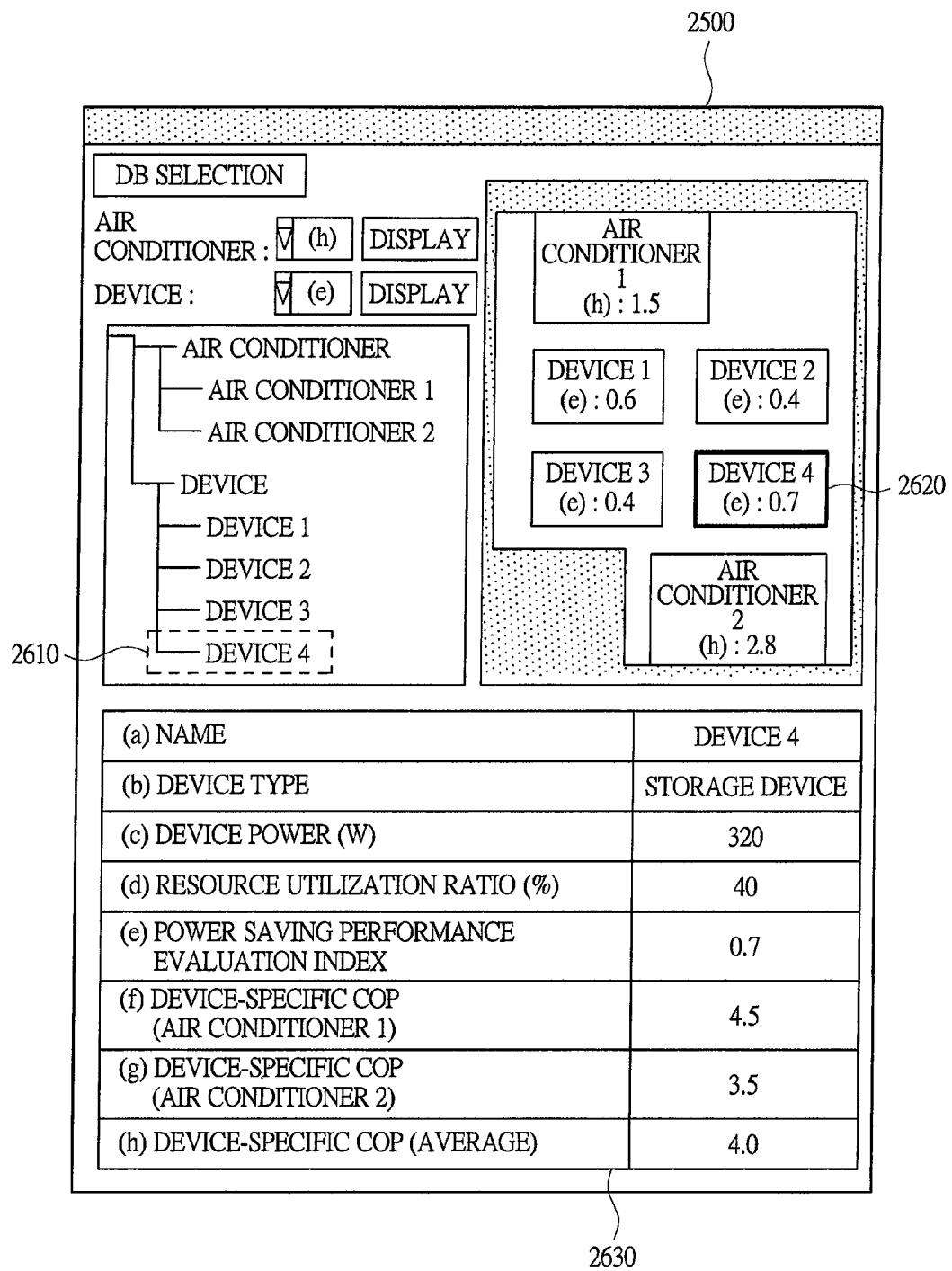
FIG. 26 shows another screen provided by the air conditioning visualization analysis tool of the fourth embodiment.

FIG. 26 shows the state in which the administrator selects "device 4" 2610 on the device/air conditioner selection screen 2520, and as a result, a storage device object 2620 is displayed in a highlighted manner on the computer room layout display screen and the detailed information of the corresponding object is displayed on the detailed information screen. In this example, display items of a detail display of the storage device include a device name, a device type, a device power, resource utilization ratio, a power saving performance evaluation index, a device-specific COP for each air conditioner and an average value of these device-specific COPs of the air conditioners.

When the administrator utilizes the air conditioning visualization analysis tool 2500, the low-cost operation of the computer room can be achieved. For example, by displaying the item "device-specific COP (Device 1)" in the air conditioner objects on the computer room layout display screen 2510, the influence of increase in device power of Device 1 on the air conditioners can be checked. More specifically, the administrator can check which air conditioner should be controlled for more effective operation in accordance with the increase and decrease of the operation state of Device 1. When the administrator performs the control by using the result, the air conditioner power can be reduced.

Furthermore, when a new workload is to be added, by displaying the item "power saving performance evaluation index" in the device object on the computer room layout display screen 2510, it is possible to confirm to which device the workload should be allocated for higher power efficiency. When the administrator performs the control by using the confirmation result, an increase in power of the entire computer room can be suppressed.

Furthermore, when a new workload is to be added in the case where output of Air conditioner 1 is close to its upper limit, by displaying the item "device-specific COP (Air conditioner 1)" in the device object on the computer room layout display screen 2510, it is possible to confirm to which device the workload should be allocated in order to minimize an increase in output of Air conditioner 1. When the administrator performs the control by using the confirmation result, the air conditioners in the computer room can be evenly used, so that a timing to introduce a new air conditioner can be delayed.

INDUSTRIAL APPLICABILITY

The present invention can be applied to integrative power saving operation management in an information processing system including a group of information processing devices such as servers, storages and networks and cooling equipment, and it is particularly suitable for a data center. Furthermore, the present invention can be used for autonomous operation management of an information processing system, and be widely applied as a system construction tool, an energy saving diagnostic tool, an operation monitoring tool and a supplementary tool for an operation administrator and an equipment administrator.

The present invention is mainly intended for a group of information processing devices, but the present invention can be applied to any device, which consumes power or energy, and equipment therefor. For example, the present invention can be applied to the operation and control of an electrical device, a machine device, a power device, a heat device and others.

What is claimed is:

1. An operation management method in an information processing system having a plurality of information processing devices and cooling equipment and deciding workload allocation to the information processing devices with an operation management device previously storing specification information of each information processing device, the method comprising:

obtaining at least one device-specific coefficient of performance (COP) relating to each information processing device, based on heat generated from the information processing devices and electric power of the cooling equipment for exchange of the heat;

obtaining index values indicating performances of each information processing device per unit power consumption relating to total power consumption of each information processing device at previously specified resource utilization ratio for each information processing device, respectively, and power consumption of the cooling equipment for cooling heat to be generated from each information processing device corresponding to the power consumption of each information processing device, based on the specification information of each information processing device and the at least one device-specific COP relating to each information processing device;

deciding workload allocation by allocating workloads based on the index values;

when the index values are obtained, power consumption of each information processing device at the previously specified resource utilization ratio is obtained based on the specification information of each information processing device, power consumption of the cooling equipment for cooling heat to be generated from each information processing device corresponding to power consumption of each information processing device is obtained based on the at least one device-specific COP relating to each information processing device, and index values indicating performances of each information processing device per unit power consumption relating to total power consumption of the power consumption of each information processing device and the power consumption of the cooling equipment are obtained.

2. The operation management method in the information processing system according to claim 1, wherein, when workloads are allocated based on the index values, a workload is allocated preferentially in order from an information processing device having a higher index value among the information processing devices.

3. The operation management method in the information processing system according to claim 1, wherein, when workloads are allocated based on the index values, whether workloads are capable of being allocated to each processing apparatus or not is determined based on the specification information of each information processing device, and a workload is allocated preferentially to an information processing device having the highest index value among the information processing devices to which a workload are determined to be capable of being allocated.

4. The operation management method in the information processing system according to claim 1, wherein, when the at least one device-specific COP relating to each information processing device are obtained, three-dimensional thermofluid simulation is applied using distribution of the heat generated from the information processing devices as input data.

5. The operation management method in the information processing system according to claim 1, wherein the information processing device is a server device.

6. The operation management method in the information processing system according to claim 1, wherein the information processing device is a storage device.

7. The operation management method in the information processing system according to claim 1, wherein the cooling equipment includes an air conditioner.

8. The operation management method in the information processing system according to claim 1, wherein the cooling equipment includes a plurality of air conditioners.

9. The operation management method in the information processing system according to claim 8, wherein, when the at least one device-specific COP relating to each information processing device are obtained, the at least one device-specific COP relating to each information processing device are obtained for each air conditioner based on heat generated from the information processing devices and electric power of each air conditioner for exchange of the heat.

10. The operation management method in the information processing system according to claim 1, wherein, when workload allocation by allocating workloads based on the index values is decided, workload allocation is decided by sequentially extracting one of the workloads to be allocated and sequentially allocating the extracted workload based on the index values.

11. The operation management method in the information processing system according to claim 1, wherein the previously specified resource utilization ratio is the maximum value of the resource utilization ratio of each information processing device.

12. The operation management method in the information processing system according to claim 1, wherein the information processing devices and the cooling equipment are arranged in a computer room.

13. An operation management method in an information processing system including a plurality of information processing devices and cooling equipment having a plurality of air conditioners and deciding workload allocation to the information processing devices with an operation management device previously storing specification data of each information processing device, the method comprising:

obtaining at least one device-specific COP relating to each information processing device for each air conditioner, based on heat generated from the information processing devices and electric power of each air conditioner for exchange of the heat;

obtaining index values indicating performances of each information processing device per unit power consumption relating to total power consumption of each information processing device at previously specified resource utilization ratio for each information processing device, respectively, and power consumption of the air conditioners for cooling heat to be generated from each information processing device corresponding to the power consumption of each information processing device, based on the specification information of each information processing device and the at least one device-specific COP relating to each information processing device for each air conditioner;

deciding workload allocation by allocating workloads based on the index values;

when the index values are obtained, power consumption of each information processing device at the previously specified resource utilization ratio is obtained based on the specification information of each information processing device, power consumption of the air conditioners for cooling heat to be generated from each information processing device corresponding to the power consumption of each information processing device is obtained based on the at least one device-specific COP relating to each information processing device for each air conditioner, index values indicating performances of each information processing device per unit power consumption relating to total power consumption of the power consumption of each information processing device and the power consumption of the air conditioners are obtained.

14. The operation management method in the information processing system according to claim 13, wherein,
when workload allocation by allocating workloads based on the index values is decided,
workload allocation is decided by sequentially extracting one of the workloads to be allocated and sequentially allocating the extracted workload based on the index values.

15. The operation management method in the information processing system according to claim 13,
wherein the previously specified resource utilization ratio is the maximum value of the resource utilization ratio of each information processing device.

16. The operation management method in the information processing system according to claim 13,
wherein the information processing devices and the air conditioners are arranged in a computer room.

\* \* \* \* \*